C. HAMANN.
CALCULATING MACHINE.
APPLICATION FILED JUNE 28, 1910.
1,011,617.
Patented Dec. 12, 1911.
7 SHEETS—SHEET 1.
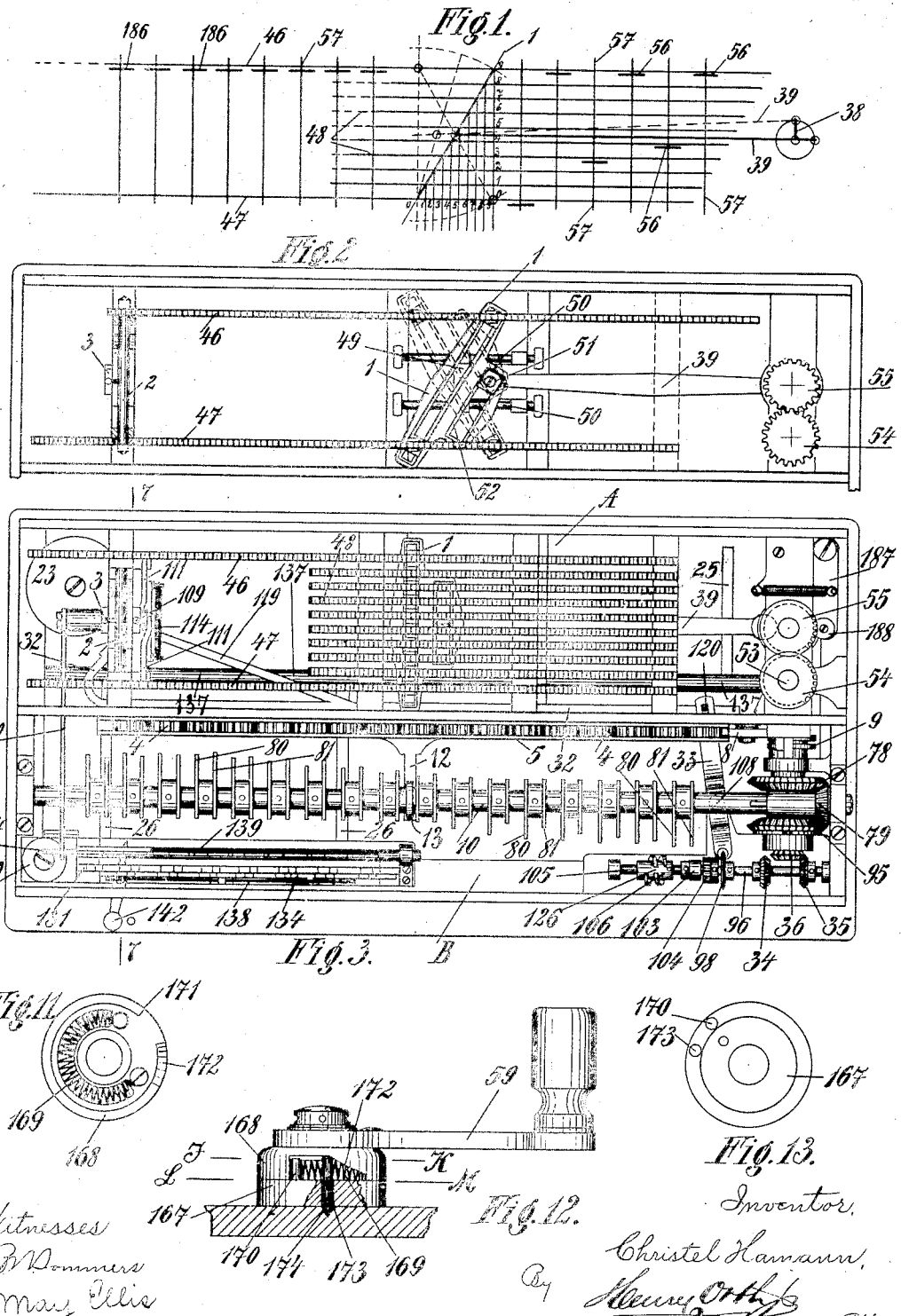
Witnesses
B. Dommers
May Ellis
Inventor,
Christel Hamann,
By Henry Orth
Atty.

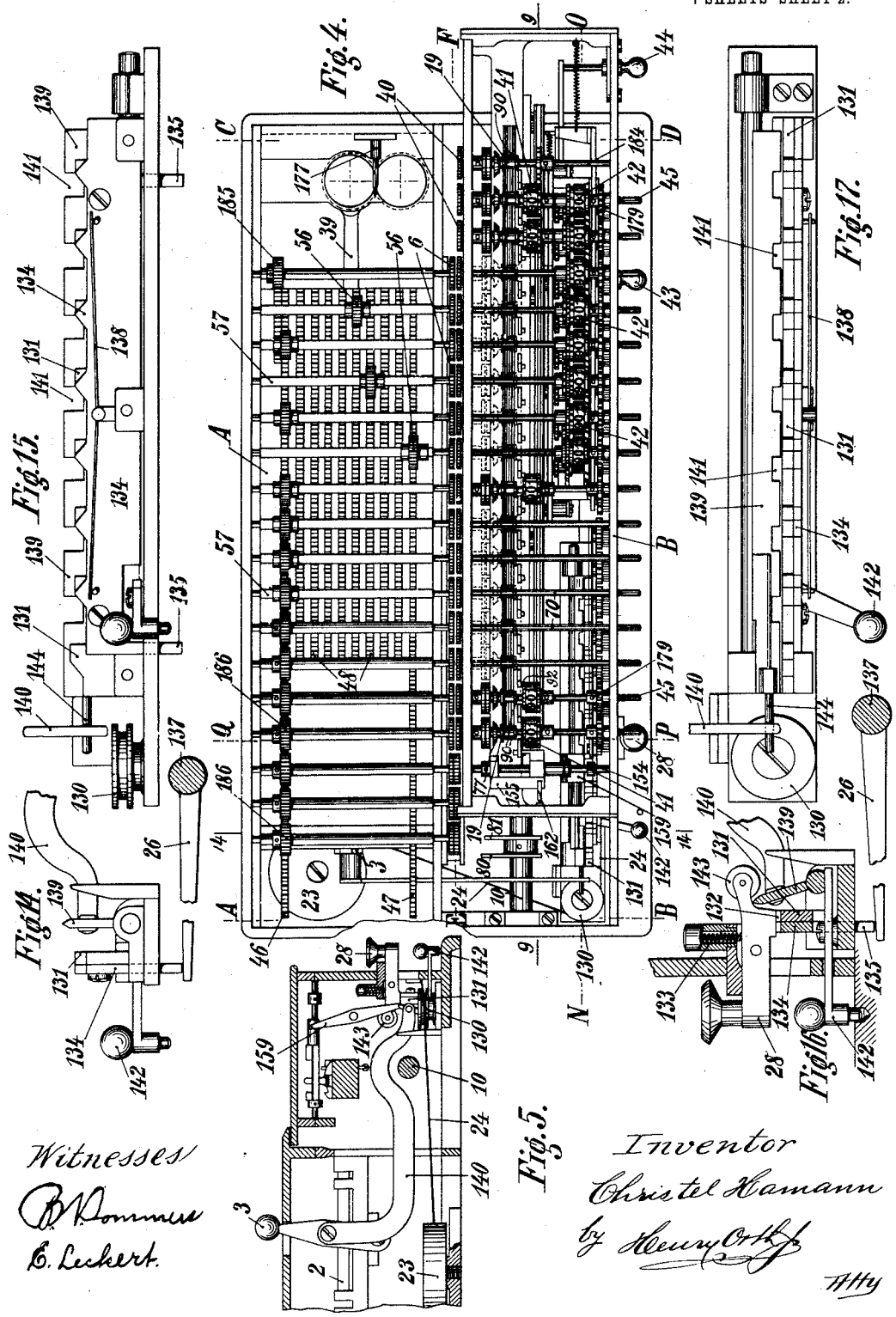

C. HAMANN.
CALCULATING MACHINE.
APPLICATION FILED JUNE 28, 1910.
1,011,617.
Patented Dec. 12, 1911.
7 SHEETS—SHEET 3.
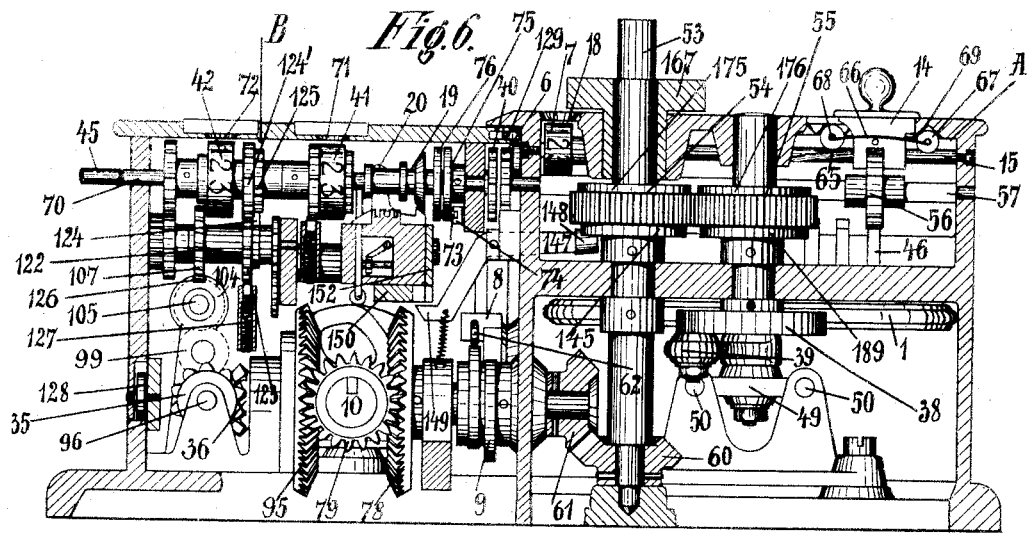
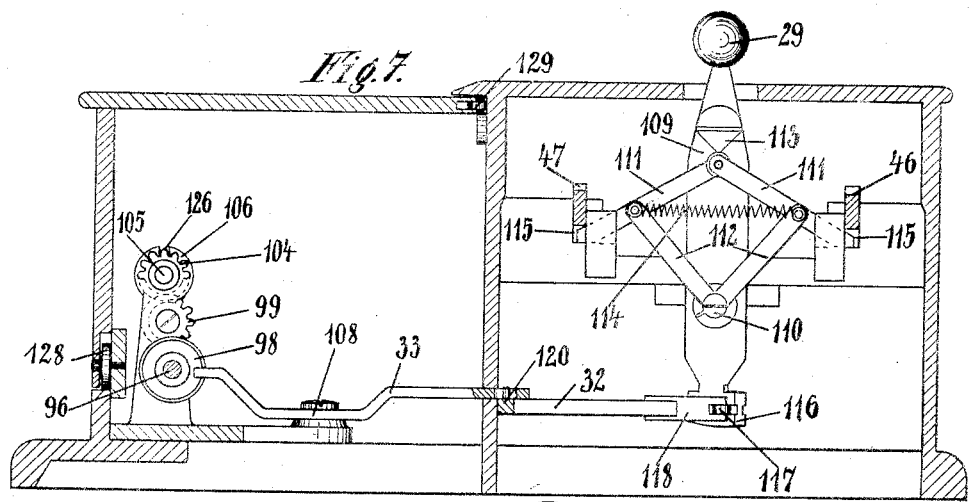
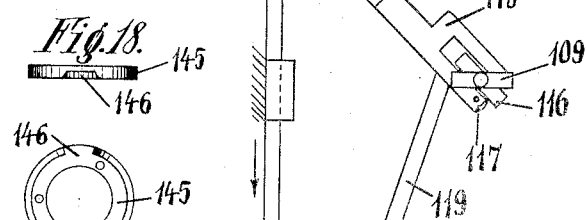
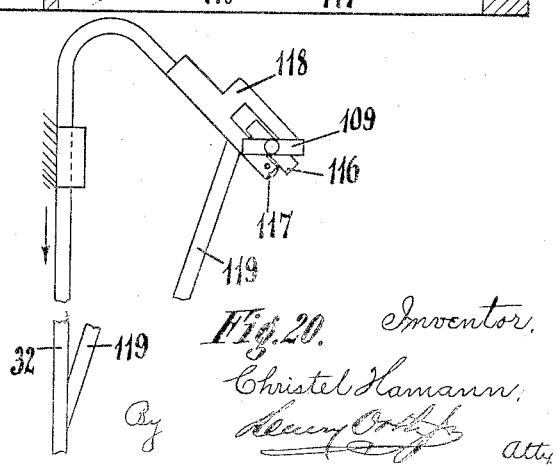
Witnesses
B. Dommers
May Ellis
Inventor
Christel Hamann
By Leuy Oolt
Atty C. HAMANN.
CALCULATING MACHINE.
APPLICATION FILED JUNE 28, 1910.
1,011,617.
Patented Dec. 12, 1911.
7 SHEETS—SHEET 4.
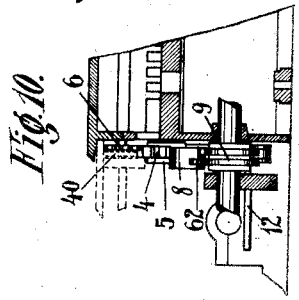
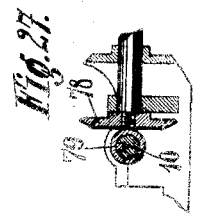
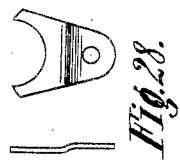
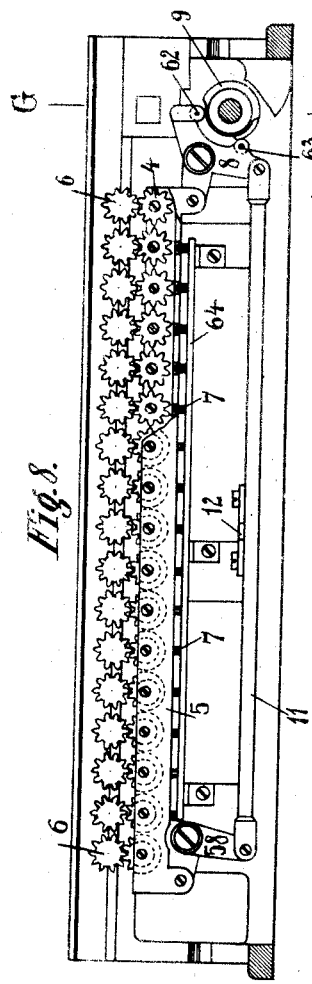
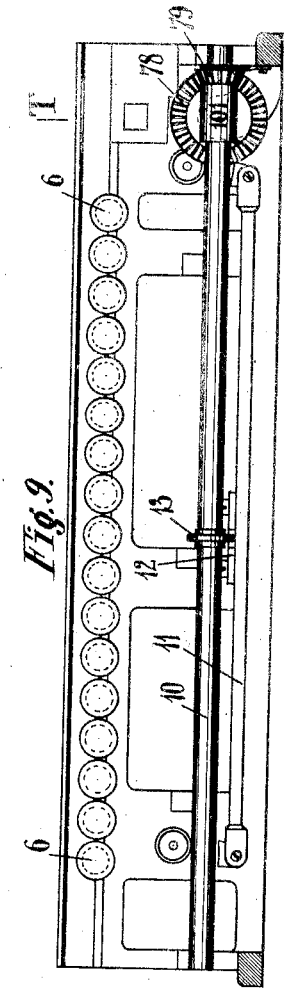
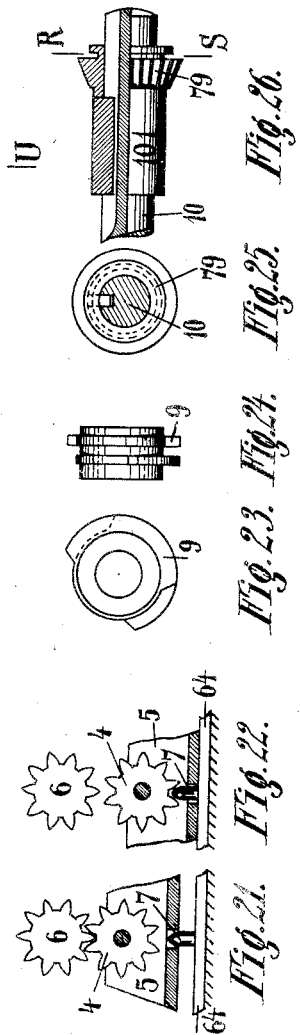
Inventor,
Christel Hamann, C. HAMANN.
CALCULATING MACHINE.
APPLICATION FILED JUNE 28, 1910.
1,011,617.
Patented Dec. 12, 1911.
7 SHEETS—SHEET 5.
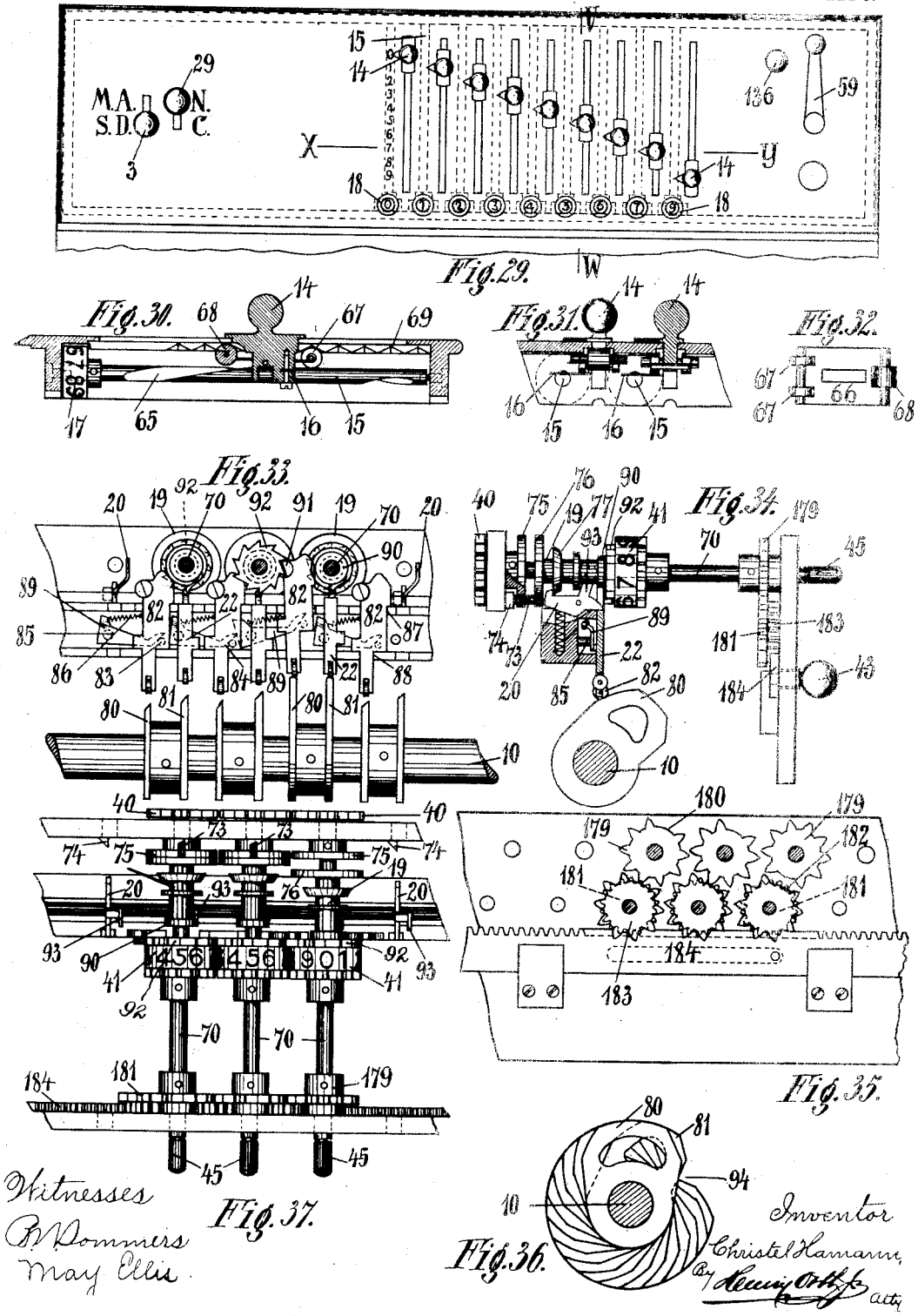

C. HAMANN.
CALCULATING MACHINE.
APPLICATION FILED JUNE 28, 1910.
1,011,617.
Patented Dec. 12, 1911.
7 SHEETS—SHEET 6.
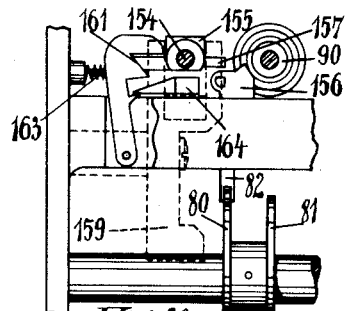
Fig.38.
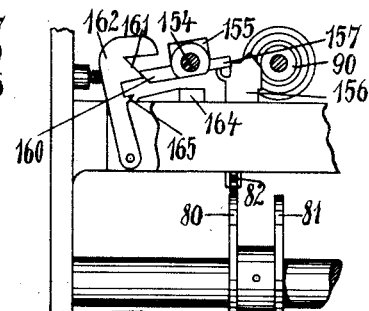
Fig.39.
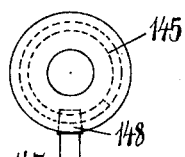
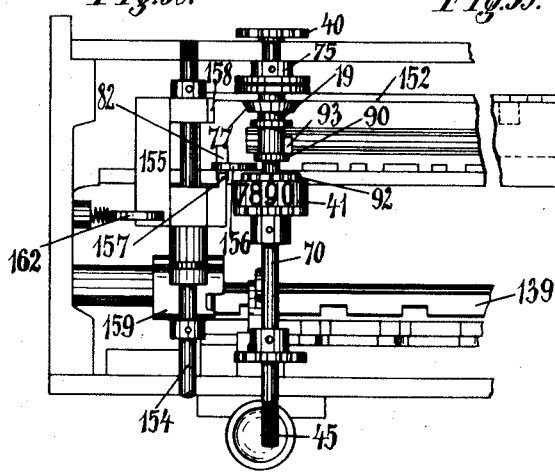
Fig.40.
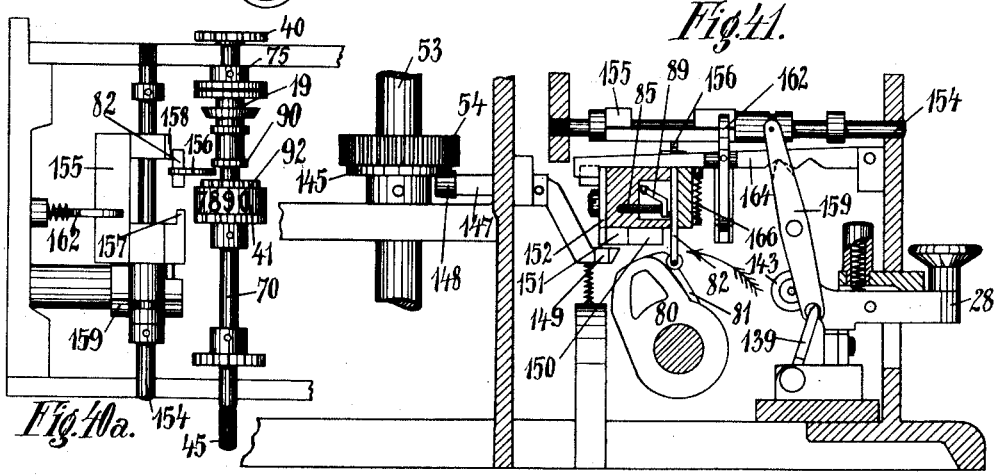
Fig.41.
Fig.40a.
Fig.42.
Witnesses
B. Sommers
May Ellis
Inventor
Christel Hamann
By Henry Orth Atty.

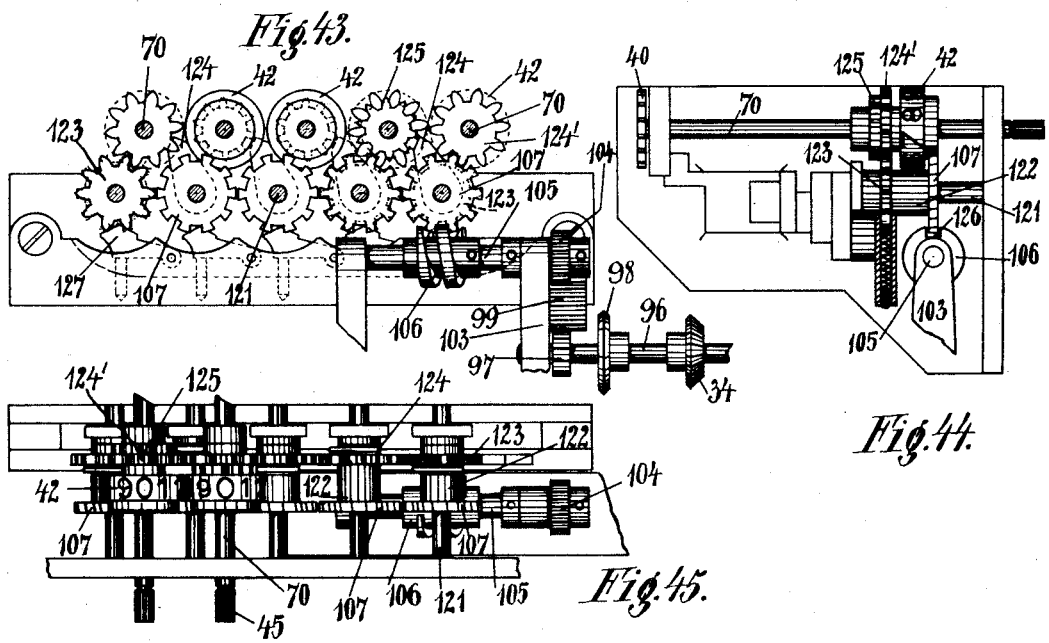
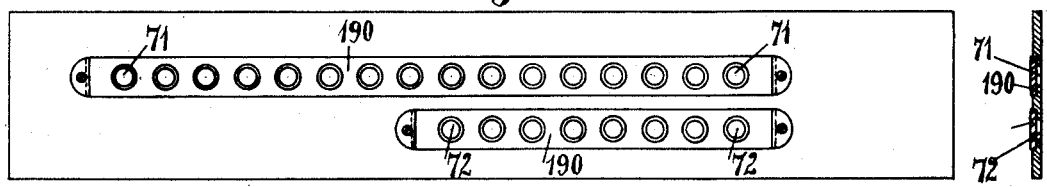
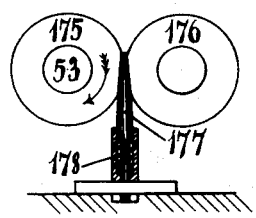

UNITED STATES PATENT OFFICE.

CHRISTEL HAMANN, OF FRIEDENAU, NEAR BERLIN, GERMANY, ASSIGNOR TO MERCEDES BUREAU-MASCHINEN GESELLSCHAFT, M. B. H., OF BERLIN, GERMANY.

CALCULATING-MACHINE.

1,011,617. Specification of Letters Patent. Patented Dec. 12, 1911.

Application filed June 28, 1910. Serial No. 569,322.

*To all whom it may concern:*

Be it known that I, CHRISTEL HAMANN, a subject of the Emperor of Germany, of Friedenau, near Berlin, Germany, have invented certain new and useful Improvements in Calculating-Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to calculating machines and has for its object the construction of a machine capable of multiplication, division, addition and subtraction.

The details of construction and features of novelty will hereinafter be more particularly described and pointed out in the claims.

Referring to the drawings in which like parts are similarly designated, Figure 1 is a diagram illustrating the operation of the setting up mechanisms. Fig. 2 is a plan view of a portion of said mechanisms showing the proportional lever in connection with the sliding racks at its extremities, the locking means for the two extreme racks and operating means. Fig. 3 is a plan view of the operating mechanism of the entire machine. Fig. 4 is a plan view similar to Fig. 3, but having all of the setting up digit wheels and the calculating digit wheels and their shafts removed. Fig. 5 is a section on the line A—B of Fig. 4. Fig. 6 is a section full size on the line C—D of Fig. 4. Fig. 7 is a section on the line 7—7 of Fig. 3, through the machine, full size, showing certain locking and shifting devices. Fig. 8 is a section on the line E—F of Figs. 4 and 5, showing the coupling mechanism between the setting up and calculating mechanisms. Fig. 9 is a section on the line 9—9 of Fig. 4, showing only the cam shaft and mechanism for longitudinally moving it. Fig. 10 is a section on the line G—H of Fig. 8. Fig. 11 is a section on the line J—K of Fig. 12. Fig. 12 is a side view partly in section of the main operating crank. Fig. 13 is a section on the line L—M of Fig. 12, seen from below. Figs. 14 to 17 illustrate the mechanisms for shifting the carriage and calculating mechanism in which Fig. 14 is a section on the line 14—14 of Fig. 4; Fig. 15 is a section on the line N—O of Fig. 4; Fig. 16 is a section on the line P—Q of Fig. 4 and Fig. 17 a plan view of Fig. 15. Figs. 18 and 19 are elevation and bottom views respectively of the disk 100 of Fig. 6. Fig. 20 is a plan view of part of the lever mechanism in Fig. 7. Figs. 21 and 22 are full sized details of the coupling wheels shown in Fig. 8. Figs. 23 and 24 are face and end views of cam 9, for actuating the coupling mechanism. Fig. 25 is a section on the line R—S of Fig. 26. Fig. 26 is an elevation partly in section of the sleeve 101. Fig. 27 is a section on the line T—U of Fig. 9. Fig. 28 shows details of the clip for holding the sleeve 101. Fig. 29 is a plan view of the setting up slides. Fig. 30 is a section on the line V—W of Fig. 29 showing the setting up slides and Fig. 31 is a section on part of the line X—Y of Fig. 29. Fig. 32 is a detail view of a part of the setting up mechanism. Fig. 33 is a front elevation of the carry-one mechanism of a number of digit wheels. Fig. 34 is a side view partly in section of Fig. 33. Fig. 35 is an elevation of zero setting mechanism. Fig. 36 is an end view of the shaft 10, Figs. 3 and 33, showing the spiral arrangement of the cams for the carry-one mechanism. Fig. 37 is a plan of the carry-one mechanism. Figs. 38 and 39 are elevations in two different positions of a portion of the crank locking mechanism. Fig. 40 is an enlarged plan view of the automatic crank locking mechanism. Fig. 40ª is a view similar to Fig. 40 showing a different position of parts. Fig. 41 is a side view of the mechanism shown in Figs. 40 and 40ª. Fig. 42 is an elevation of the bar 152. Fig. 43 is an elevation of the quotient indicating mechanism. Fig. 44 is a side elevation thereof. Fig. 45 is a plan view of Fig. 43. Fig. 46 is a plan view showing the sight openings for the dividend and divisor. Fig. 47 is a section of Fig. 46. Fig. 48 is a plan view partly in section of the brake mechanism.

The machine comprises a substantially rectangular casing, longitudinally divided into two parts A and B by a partition and one of the parts B includes a carriage, capable of being laterally moved with the calculating mechanism mounted therein. The stationary or rear portion of the machine contains the setting up mechanism while the movable portion contains the adding multiplying and dividing mechanism.

The setting up mechanism comprises a plurality of parallel racks here shown ten in number, longitudinally slidable in transverse guides, Fig. 3. The two outer racks 46 and 47 are longer than the eight intermediate racks 48. Beneath the racks is mounted a proportional lever 1, Figs. 2, 3 and 6. This lever is pivotally mounted on a block 49, slidable to and fro on guide rods 50. Pivotally mounted to the bottom of each of the racks 46, 47 and 48 is a block slidable in a slot of the proportional lever 1. This proportional lever has a second slot in which is slidable a block 51 to which is pivoted a connecting rod 39 connected to a crank 38. The two long outer racks 46 and 47, Fig. 2, are capable of being locked alternately in their normal or zero positions, by means of a bolt 2, Fig. 2, operated by a lever 3, Figs. 2, 3, 5 and 29, said lever 3 being pivoted at its end to the stationary guide for the left hand ends of the outer racks 46 and 47. The bolt 2 is adapted to enter a bolt hole in each of the long racks 46 and 47 so that either one or the other of the long racks can be held stationary. In Fig. 2, for example, the rack 47 is shown locked in its normal or zero position, the end of the bolt 2 entering the bolt hole and holding the rack 47 stationary. This holds the block pivoted to the bottom of rack 47 stationary and causes the proportional lever 1 to pivot about this block and all the other racks are then proportionately moved increasing distances corresponding respectively to the 9 digits, see diagram Fig. 1, so that the machine will operate for addition. The lever 3 cannot be moved to lock the other long rack 46 until all the racks have been brought back to their zero position, Fig. 3, inasmuch as the bolt hole at any other time has been moved past or is out of register with the bolt 2. Furthermore if the lever 3 has only been partially moved so that the bolt projects into both the bolts 24 in racks 46 and 47 when these racks are in their zero position, Fig. 3, both racks are locked against movement and the machine cannot be operated. On the other hand when rack 46 is locked in its zero position and rack 47 is released then the pivot point of the proportional lever 1 is shifted from rack 47 to rack 46, rack 46 becomes the zero digit and all the other racks are then proportionately moved corresponding to the digits 1–9 but in the inverse order and subtraction results, the operating crank or handle 59 always being turned in the same direction for both addition and subtraction, see dotted line position, Figs. 1 and 2.

The crank 38 on which the connecting rod 39 is pivoted is mounted on a vertical counter shaft on which is a gear wheel 55 meshing with the gear wheel 54 on the main vertical actuating shaft 53 which latter shaft at its upper end is provided with an operating crank 59.

Extending transversely across the racks are a number of square shafts 57 journaled in the frame of the machine, Figs. 4 and 6 and on each of these shafts is slidably mounted a ten-toothed gear wheel 56 capable of being slid into mesh with any of the racks. Between these square shafts there are round shafts 15, above the plane of the latter, Fig. 6. Each round shaft is provided with a flattened portion or steep spiral 65 on which presses a leaf spring 16 secured by a screw in a slide 14, Fig. 30. This slide 14 has a slot on its under side that takes over the gear wheel 56, Figs. 6, 30 and 31. The slides are mounted to slide in slots Fig. 29 in the casing and have pointers adapted to be placed opposite any one of the digits 0–9 marked on the casing adjacent to the slots in the casing. In Fig. 32 is shown a leaf spring 60 carrying two rollers 67 on one end, and a single roller 68 on the other end and provided with a rectangular hole. The slide 14 passes through the rectangular hole and the spring is held in place on the slide by a pin. The under face of the casing adjacent the slot is provided with notches 69 into which rollers 67 and 68 are snapped as the slides 14 are moved to and fro in their slots. The movement of the slide by reason of the pressure of spring 16 on the flattened portion 65 of shaft 15 rotates this shaft and at the same time positions or moves the ten-toothed gear wheels 56 into engagement with their racks. In order that the number set up on the slides 14 may readily be read each shaft 15 is provided with an indicating wheel 17, the indices of which are read through openings 18, Fig. 29, in the casing. The spirals 65 are of such a pitch that upon moving the slide 14 a space in one direction or the other i. e. from one number to the other in the same line of digits, the shaft 15 and its index wheel 17 are rotated one-tenth.

Inasmuch as a complete rotation of the main actuating shaft 53 effects the complete rotation of a counter shaft, Fig. 6, together with the crank 38 this will cause a complete swinging of the proportional lever 1 back and forth so that the number set up by the slides 14 is transmitted by the movement of the racks in one direction to the wheels 56 during the first half of the revolution of the crank 38 and during the second half of the revolution of the crank the racks are returned to zero position, the number that has been set up and showing at the openings 18 still remaining. The number set up by the slides 14 is indicated at the openings 18, Figs. 6 and 29, and remains so set, for the reason that the shafts 15 do not partake of the rotation of the wheels 56 and shafts 57, so that any number which has been set up on the slides 14 and index wheels 17 can be added or subtracted as many times as the operating handle is rotated. In order that the number set up may be permanently maintained and indicated this number must be transmitted to the registering or computing mechanism during the first half of the revolution of the crank 38 and to this end I provide coupling mechanism to transfer the set up number from the setting up mechanism to the computing mechanism during the first half revolution of the crank 38. On each square shaft just beyond the central partition, Figs. 4 and 5, is mounted a ten-toothed gear wheel 6 and in alinement therewith is a similar toothed gear wheel 40 pertaining to the computing mechanism hereinafter described.

Beneath the alined gear wheels 6 and 40 and capable of simultaneously engaging both of them are ten-toothed wide faced gear wheels 4, Figs. 8, 10, 21 and 22. These gear wheels are mounted in the frame 5, having substantially vertical movement, which frame forms a portion of a parallelogram or a parallel motion, being pivoted at its ends to bell crank levers 58 and 8, said bell crank levers being pivotally connected to one another by a rod 11. These bell crank levers 58 and 8 are pivoted on screws, secured in the central partition. The bell crank lever 8 carries two rollers 62 and 63 acted upon by cams 9 secured on a shaft that carries a pinion 61, Fig. 6, in mesh with a pinion 60 on the main driving shaft 53. The cams 9 are so selected and formed that they will act upon the rollers 62 and 63 to properly move the bell crank lever 8. One cam 9 acts on roller 63 to move the connecting rod 11 to the left at the beginning of the first half of the revolution of the main shaft 53, and the other cam 9 operates on roller 62 during the second half revolution of the main shaft 53, whereby both bell crank levers 58 and 8 will be simultaneously moved and lift the frame 5 with the gear wheels 4 mounted therein and cause them to simultaneously mesh with the gear wheels 6 and 40 and will withdraw wheels 4 again from engagement with the wheels 6 and 40 during the second half of the revolution of shaft 53. Thus it will be seen that as soon as the wheels 6 begin to rotate they are coupled by wheels 4 to wheels 40 and when they have been rotated to the extent designated by the number set up they will have transferred their movement through wheels 4 to wheels 40 and are then uncoupled.

In order that the coupling wheels 4 shall always maintain their proper position with relation to wheels 6 and 40 to insure proper engagement I provide just below frame 5 a stationary bar in which are secured pins 7, Figs. 8, 21 and 22 that pass through perforations in the bottom of frame 5 and project into the interdental spaces of the coupling wheels 4 when the frame 5 is in its lowermost position, Fig. 22, and when the frame 5 is raised to coupling position, Fig. 21, the wheels 4 are out of range of the pins 7 so as to be free to rotate.

The calculating mechanism is mounted in a carriage which carries shafts 70 on whose rear ends are mounted the wheels 40. Each shaft 70 has secured to it an index wheel 41, Fig. 4, that are viewable through the openings 71, Fig. 46, (a number of these wheels and other mechanisms mounted on shafts 70 are omitted from a number of said shafts for the sake of clearness). A number of shafts 70 to the right, Fig. 4, carry a second index wheel 42, but these index wheels 42 are free to rotate on their shafts 70 and are viewable through openings 72, Fig. 46. This second set of index wheels serves to indicate the quotients as will be explained later. Each shaft 70 projects through the front of the carriage, Fig. 4, and has milled ends 45, in order that these shafts may be readily turned by hand.

To produce proper addition when the shafts 70 are rotated by the coupling mechanism these shafts 70 must be provided with a carry-one mechanism in order to carry a unit from one shaft to the next higher adjacent shaft, when the index wheel 41 passes through nine to zero, and this is accomplished by the following mechanism: On each shaft 70 there is secured a disk 75 provided with a notch into which projects a pin 73, having a beveled end, mounted on a disk 76 that is secured to a sleeve 19 longitudinally slidable on the shafts 70, Figs. 6, 33, 34 and 37. In the path of these pins 73 are beveled cams 78 secured to the carriage so that when the disks 75 and 76 rotate from the position shown in Fig. 6 to the position shown in Fig. 34, the sleeve 19 will be moved longitudinally on shaft 70 toward the front of the machine. In order to hold this sleeve in its moved position it carries a cam disk 77, which, when the sleeve 19 is axially moved, passes over a hook 20 urged by a spring and pivoted to a part of the carriage. This preparation for the carrying of a unit from one wheel to another takes place in the first half of the revolution of the operating handle, but the actual transfer takes place during the second half of the revolution of the handle at the time that the setting up mechanism is disconnected from the computing mechanisms, i. e., when the coupling wheels 4 are disengaged.

Referring to Fig. 6, a miter gear wheel 78 meshes with a miter gear wheel 79, the diameters of which gear wheels are as two to one. The gear wheel 79 is splined in a shaft 10, Fig. 26 and is held in position by a forked ratchet Fig. 28, taking into a groove on wheel 79. Secured to the shaft 10 are a number of pairs of cams 80, 81, Fig. 33, a pair for each digit of the computing mechanisms. These pairs of cams are arranged in a spiral on shaft 10 as more clearly shown in Fig. 3. The shaft 10 is capable of sliding with respect to the gear wheel 79, by reason of the spline connection. At the beginning of the first half revolution of the handle the shaft 10 is moved slightly to the left in order that the cams 80 and 81 can rotate idly. This movement of the shaft is accomplished by the following mechanism:— On the bar 11, Figs. 8 and 9, which forms part of the coupling mechanism heretofore described, is mounted bar 12 which has a forked end that engages a disk 13 secured to the shaft 10 so that as the coupling takes place between the setting up and computing mechanisms, the shaft 10 is moved to the left, causing the cams 80 and 81 to move out of the path of the carry-one mechanism. At the end of the first half revolution of the main shaft 53 the coupling mechanism is disengaged and the shaft 10 moved to the right, the shaft 10 having completed one revolution, whereby cams 80 and 81 have been moved under the carry-one mechanism. This mechanism comprises a number of vertically movable slides 22, Fig. 33, having rollers at their lower ends, said rollers positioned to be acted upon by the cams 80 and 81. The left hand cam 80 of each pair of cams first comes into action and is then followed by the second cam 81 so that one set of slides is raised in advance of the other set. The slides 22 are mounted in a rail on the carriage. Each slide has a pin 83, against which rests the beveled end of a pawl 89 pivoted back of the slides. A spring 86 connects the tail of the pawl with its pertaining slide. The slots 87 and 88 in the rail in which the slides are guided are somewhat wider than the slides and these slides by reason of the spring 86 and pawl 89 are held vertical and against the right hand walls of their slots. Should the slides meet a resistance upon being raised by the cams 80 they will tip to the left on rollers, mounted in the lower reduced ends of the slides, as pivot points, and this occurs when the slide is raised by its cam 80 and in so doing strikes a flange 90 on the sleeve 19, Fig. 34, so that it is tipped to the left, Fig. 33. In so tipping a tooth 91 engages a ten-toothed ratchet wheel 92 on the next adjacent digit and turns said shaft one digit. Inasmuch as the distance between the flange 90, Fig. 34, of one shaft 70 and the ratchet wheel 92 on the next higher shaft 70 is just sufficient to permit the slide to lift and rotate the ratchet wheel one tooth, it is not possible that the ratchet wheel 92 can override, and also for the reason that the tooth is shaped to conform to the tooth of the ratchet wheel 92. The second cam 81 of the pair of cams 80, 81 then comes into operation and lifts a vertically movable slide. The slide acts on the tail of a hook, which holds the sleeve 19, releases the sleeve, and simultaneously causes an arm 93 on the hook 20 to act on a flange and slide the sleeve 19 back into its normal position. These pairs of cams 80 and 81 come into action successively by reason of their spiral arrangement on shaft 10 and the successive pairs operate to transfer a unit when necessary from one digit shaft 70 to an adjacent one during the second half of the revolution of the main shaft 53 and handle.

In order that the shaft 10 may be moved axially without hindrance at the beginning of the first half revolution of the main shaft 53, the spiral arrangement of the cams 80 and 81 is not continued completely around the shaft by a certain number of degrees leaving hiatus in the spiral arrangement as shown at 94, Fig. 36, to permit the shaft 10 to be moved longitudinally without engaging any of the slides.

Rotating the shaft 10 twice and permitting it to have a sliding movement is of advantage in that it permits the use of smaller cams, thus considerably reducing the size of the machine, than if the shaft was rotated only once and not slidable.

The mechanism for indicating the quotient when performing division is shown in Figs. 43, 45 and 7. The gear wheel 79, Fig. 6, drives a bevel gear wheel 95, once for every two revolutions of the wheel 79, or in other words gear wheel 95 is rotated in unison with 78. The gear wheel 95 rotates the miter gear wheel 36 to which it is connected. Parallel to the cam shaft 10 is a shaft 96 which is longitudinally slidable in order to cause either of two miter pinions 35 and 34 (Fig. 43) mounted on one end thereof to mesh with the miter gear 95 to rotate the shaft 96 in opposite directions. This shaft 96 carries at its opposite end a narrow pinion 97, Fig. 43, and a disk 98. Pinion 97 meshes with a wide faced pinion 99 journaled in a post 103 that forms the bearing for one end of the shaft 96. This intermediate wide faced pinion 99 meshes with a pinion 104 on the right hand end of a worm shaft 105 journaled in posts 103. When the shaft 96 is moved to the left miter pinion 35, Fig. 6, engages miter gear 36 and miter pinion 34 is simultaneously disengaged and vice versa when shaft 96 is moved to the right. The two shafts 96 and 105 rotate in the same direction and on the shaft 105 is a worm 106. The worm 106 gears with a worm wheel 107. The movement of which is transverse to wheels 107 of the quotient mechanisms as will hereinafter be more fully described. If multiplication is to be effected this mechanism, Fig. 43, must go forward, if division is to be effected it must rotate backward and in order to do this always with the main operating shaft 53 moving in the same direction it is necessary to shift shaft 96. This shifting is effected by a mechanism shown in Figs. 3, 7 and 29 by the knob 29 from which the shifting of shaft 96 is accomplished. Disk 98 is engaged by the forked end of the lever 33, Figs. 3 and 7, pivoted at 108, and lever 33 is connected by pivot pin 120 to a bent rod 32, Fig. 20, the bent end of which is stiffened by a brace 119 and carries a fork 118 carrying anti-friction rollers 117. This rod is longitudinally slidable in guides. In fork 118 operates the lower end 116 of a lever 109 which lower end is bent about 30° to the main portion of the lever 109 and is provided with grooves in which take the rollers 117. This lever is pivoted at 110 to the rack guide, Figs. 2, 3 and 7. When the lever 109 is in the position shown in Fig. 7, the main operating crank of the machine cannot be turned and this is prevented by two rocking bars 111, pivoted together and carrying a roller at their pivot point. These two bars 111 have pivoted to them links 112, said links being pivoted at their opposite ends on the pivot point of lever 109 at 110. A spring 114 connects the two pivot points. Bars 111 take into slot 115 in the long outer racks 46 and 47 and prevent these racks from being moved when the mechanism is in the position shown in Fig. 7. The lever 109 has a wedge shaped projection 113 which when the lever is moved about its pivot point 110 sets free the roller and permits spring 114 to withdraw the bars 11 from the notches 115. The movement of the lever 109 about its pivot point 110 simultaneously shifts rod 32, lever 33 and throws one or the other of the miter pinions 34 or 35 into gear with miter gear 36. The knob 29 and lever 109 cannot be moved from one extreme position to the other during the partial rotation of the main shaft 53 for the reason that one or the other of the racks 46 and 47 has been moved out of normal position, thereby displacing the notch 115 so that the lever 109 cannot pass the central position shown in Fig. 7.

As already stated the worm 106, Figs. 3 and 43, and its shaft 105 make one revolution for every rotation of the main shaft 53 and the worm wheel 107 is moved one tooth. The worm wheels 107 carry ten-toothed gear wheels 123 and adjacent these are single tooth-wheels 42. The pawls 124, toothed-wheels 123 and wheels 107 are all mounted on a sleeve 122 which is free to rotate on shaft 121, actuated in a plane below shafts 70. Above the shafts 121 are some of the shafts 70 that belong to the computing mechanism and on these shafts are also sleeves free to rotate and carry ten-toothed wheels 124' indicating wheels 42 and a small toothed wheel 125. The ten-toothed wheels 123 and 124' mesh with one another and the wheel 125 is capable of being engaged by the single toothed wheels or pawl 124 on shaft 121 which serves to transfer a unit from one sleeve to the other. The rotation of the worm 106 is thus transmitted through worm wheels 107, gear wheels 123 and 124' to the index wheels 42. If the index wheels 42 show nine through the opening 72 and the crank handle is again rotated the point of pawl 124 engages a tooth of wheel 125 and moves it with its index wheel 42 the space of one unit. The same operation takes place both in the forward and rearward direction by reason of the symmetrical form of pawl 124, that is, when division is being made it carries its wheel from 0 to 9.

Inasmuch as the shafts 121 and 70 are mounted in the sliding carriage it is necessary that the worm wheels 107 shall be able to move longitudinally with respect to the worm 106 and to this end the worm is provided with a slot 126, Fig. 3, so that the frame may be moved longitudinally at the end of every revolution of the crank handle.

In order that the indices on the index wheels 42 shall always be properly positioned with respect to its openings 72 there is provided beneath each ten-toothed wheel 123 a pawl 127.

The divisor is set up from the sliding knobs 14, Fig. 29, and the dividend is set up by the handles 45, projecting through the front of the carriage Fig. 4. After setting up the dividend and divisor the main crank is turned until it is stopped or a number is given in which a number of nines appear in the higher digits of the machine which shows that the mechanism is operating negatively and the divisor has been subtracted once too many times from the dividend (the crank having been turned once too many times), there being a small remainder. The setting up mechanism is then reversed and the handle turned until it is stopped thereby adding the divisor as many times as will be permitted for the appearance of either zeros to the left or nines to the left. If zeros appear the divisor is contained an even number of times in the dividend. The frame is shifted to the left automatically as will be explained later. Let us suppose that we wish to perform the following example; divide 390625 by 625. The dividend 390625 is set up by the handle 45, the divisor 625 is set up on the setting up mechanism by the knob 14, Fig. 29, the carriage is moved to the right so as to position the left hand digit "3" of the dividend beneath the left hand digit "6" of the divisor. The knob 3, Fig. 29, is moved to division, the knob 29, Fig. 29, is placed at normal, the knob 3 locks the rack 47 by means of bolt 2. The setting up wheels 56 of the three digits set up in the divisor are rotated by their respective racks to an extent equal to the complement of the divisor and all the other setting up wheels 56 which are in engagement with rack 46 are rotated nine digits so that we have the following results after one revolution of the crank;

```
          390625
          999375
          999765625
``` whereupon the crank is locked. The knob 29 being set at normal has moved rod 32 to the left thereby causing pinion 34 Fig. 3, to engage with wheel 36 and causing the quotient mechanism to show "1," i. e. register the number of crank handle revolutions. It will be observed that the setting up mechanism has a number of round shafts to the left of square shafts 57, each of which has a ten-toothed gear wheel 186 permanently in engagement with rack 46 and gear wheel 6 so that when rack 46 is moved to add the complement of a number these shafts will cause nines to be added in on all shafts 70 in the carriage to the left of the number set up therein. Knob 3, Fig. 29, is now set for addition and knob 29 set for correction, that is the two knobs are placed in positions opposite to those shown in Fig. 29. This operation moves the carriage one step to the left, releases rack 47 and locks rack 46 of the setting up mechanism and causes gear wheel 35 to engage gear wheel 36, Fig. 6, thereby reversing the direction of rotation of the quotient index wheels 42. Each time the knob 3 is shifted, the main operating crank shaft 53 is released as will be hereinafter more specifically described, and the sliding frame is automatically moved one step to the left. The crank is now turned until it again becomes locked, i. e. four times; thus adding 4×625 to the result we have previously obtained;

```
          999765625
          2500
          000015625
```

At the end of the 4th rotation of the crank we have zero appearing as the last left digit of the adding mechanism. The sliding frame having been displaced one digit to the left so that worm wheel 107, that registered one has been moved out of engagement with the worm 106, Fig. 43, and the wheel 107 to the right of it has come into engagement with the worm and this worm has been negatively rotated four steps, i. e., from zero to six and inasmuch as the negative rotation of this wheel has taken place through zero the single tooth or pawl 124 has repositioned the first mentioned worm wheel in its zero position, the one which previously indicated in the quotient is now displaced and six appears at the next opening 72, Fig. 46, to the right. The knobs 3 and 29, Fig. 29 are again placed in the position shown in Fig. 29 and the main shaft 53 again rotated until locked. The complement of the divisor is added to the remaining partial dividend three times i. e., as follows:

```
          015625
          99375
          009375
          99375
          003125
          99375
          996875
``` and there shown in the quotient opening 72. The knobs 3 and 29 are now reversed from the position shown in Fig. 29 and the dividend added five times, i. e. as follows:

```
          996875
   4×625=  3125
          000000
```

The worm wheels 107 being negatively turned through zero to five the tooth 124 moves the next higher wheel through one space so that the "3" is changed into a "2" and we have the quotient reading 025. Thus it will be seen that if we did not have a carry-one mechanism in the quotient mechanism, Fig. 43, we would have the number 1435 appearing at 72 and by reason of the carry-one mechanism the one is caused to disappear, the "4" is changed into a "6" and the "3" into a "2". The two knobs 3 and 29 lie adjacent to one another so that they can be operated simultaneously by the fourth finger and thumb.

In the operation of the machine it is advisable that there be automatic stopping mechanism for stopping the rotation of the main crank without having to notice whether nines or zeros appear at the left and it is also necessary that carriages be automatically shifted. The carriage is mounted to slide on rollers 128, Figs. 6 and 7 and mounted at the left of the machine, Figs. 4 and 5, is a drum 23 having a spiral spring not shown urging this drum in the direction of the arrow, Figs. 4 and 5. Secured to this drum is chain, cord or the like 24, Fig. 4 secured to the carriage. Secured to the frame is a rack 131, Figs. 4, 5 and 16 and on the sliding frame is pivoted a key lever 28, Fig. 16, which has a projection 132 that engages the rack 131 and is urged into engagement therewith by a spring 133. As shown in Fig. 15 the teeth of this rack are beveled on the left hand side so that the sliding frame carrying the key 28 can readily be pulled to the right whereupon said key lever 28 will automatically ride over said teeth during the movement of the carriage. The carriage, however, is prevented from moving to the left by the vertical walls of the teeth of rack 131 against which the projection 132 and key lever 28 rests. The teeth of this rack are distanced from one another the space between the shafts of the setting up and adding mechanism, pressing on the key lever 28 releases the carriage from the rack which is then free to travel to the left.

In addition to the mechanism just described I provide mechanism for moving the carriage step by step to the left and this comprises a second rack 134 placed immediately in front of the rack 131 whose teeth are beveled on each side, see Fig. 15. The rack 134 has at each end downwardly projecting lugs 135 which may be hand operated by key 136, Fig. 29 that depresses a lever 25, Fig. 3, on shaft 137, said shaft having two lever arms 26 positioned beneath the lugs 135, Figs. 3 and 16. The dog 13, Fig. 16, on the key lever 28 under normal conditions enters between the teeth of both racks 131 and 134. By lifting rack 131 the dog 132 is lifted from rack 134 and the carriage moves one step to the left for the reason that this dog 132 simply rides over one of the beveled teeth of rack 131. Spring 138 secured between its ends in a post bears with said ends on pins in rack 134 and moves this rack downward with its lugs 135, oppositely rotates shaft 137, and moves key 136 to normal position when released by the operator. The automatic movement of the carriage takes place for ordinary calculations but in division it is accomplished by other mechanism as follows: When the knob or lever 3, Figs. 5 and 29, is moved to either subtraction or addition and vice versa, it moves with it the lever 140. Said lever having a hole at its forward end through which slides a pin 144, Fig. 17, secured to a rockable cam plate 139 capable of being rocked under a roller 143 on the key lever 28, Fig. 16, so that every time the lever 3 is shifted in one direction or the other the rocker cam plate 139 passes under the rollers 143 and lifts the key lever 28 from its notches and permits the carriage to move one space to the left. The rocker plate 139 is provided with notches, Fig. 17, spaced apart the same distance as the computing shafts 45 into which the roller 143 can drop should the rocker plate 139 not have passed entirely from under the roller, and the spring 133, Fig. 16, can then depress the key lever 28 into the next notch of the rack 131 so that the carriage will be shifted only one decade to the left.

Under some conditions, i. e., when addition and subtraction are to be performed the rocker plate 139 must be placed out of operation and in order to effect this the rocker plate is longitudinally slidable. This is accomplished by means of a hand lever 142, the tail of said lever engaging a notch in the bar 139. The shifting of this bar will permit one of the notches therein to be positioned beneath the roller 143 so that the rocker plate 139 can be swung to and fro without affecting the roller. The rocker plate is held in operative or inoperative position by a pin or lever 142 taking into a pair of holes in the base of the frame of the machine, Figs. 4 and 16. In order to prevent the shifting of the carriage unless the crank handle 59 is in its initial position I provide on the main actuating shaft 53 a disk 145, Fig. 6, as shown in detail in Figs. 18 and 19. This disk has on its under side a recess 146 into which takes a roller 148 mounted on one end of a centrally pivoted lever 147, (Fig. 6) and urged against the disk by spring on the other end of said lever. The tail of this lever is beveled at 149 and lies below a rack 150, Fig. 40, connected to the carriage. This rack has recesses 151, spaced apart the same as the computing shafts 45 and it is evident that the carriage can not be moved when the roller 148 is out of its recess 146, whereby the tail of the lever 147 will be within one of the recesses 151. Immediately the main crank shaft 53 is turned the carriage is locked against lateral displacement until said crank has completed its revolution. Likewise should the carriage not be in proper position the main crank can not be turned. The lever 147 is provided at 149 with a lateral bevel, Fig. 41, which as it enters correspondingly beveled recesses 151 in the rail 152 longitudinally removes this rail i. e., at each rotation of the operating crank. As heretofore stated this crank is to be locked after one or more rotations, i. e., when one is added to a number of nines or when one is subtracted from a number of zeros appearing at the openings 71 and this locking is accomplished through the rail 152 by the following mechanism; see Figs. 40, 42, 43 and 44. Following the last computing shaft to the left, Fig. 40ª, is a shaft 154 and when the last shaft 70 stands at "0" and a number is added thereto a transfer to the next higher decade should take place but instead the following mechanism is actuated on shaft 154. On shaft 154 is a bolt 155 slidable thereon. This bolt shown in Fig. 41, is engaged by the upper forked end of a lever 159 pivoted at its center, the lower forked end of which engages the rocking plate 139, so that when this plate is rocked, bolt 155 is shifted to and fro on its shaft 154 between stops on the shaft. Passing through the fork of lever 154 is a lever having a cam on its under side so that this lever will be raised and lowered by lever 154 at each shifting of the rocker plate 139 and at each shifting of the lever 3. Bolt 155 is capable of being rocked on its shaft 154 and to this end two engaging faces 157 and 158, Fig. 40ª are provided. These faces are capable of being engaged respectively by pins 82 on the last slide 156 of the carry-one mechanism in all respects similar to the slides 22, Fig. 33, and in like manner is operated by a cam on the cam shaft 10. Upon subtraction the bolt has the position shown in Figs. 40 and 41 and upon addition it assumes the position shown in Fig. 40ª. Upon adding, the flange 90 of the carry-one mechanism of shaft 70 engages the slide 156 and causes one of the pins 82 to engage face 158 and trip the bolt 155 to the position shown in Fig. 39. If the carry-one mechanism is not operated the slide 156 is free to rise and fall idle. If the mechanism is set for subtraction, Fig. 40, one of the pins 82 engages face 157 and trips the bolt 155 consequently this bolt will be tripped when the carry-one mechanism, Fig. 40ª is inoperative, but when it is operative in this position of the bolt slide 156 is tipped to the left and the pin passes to the left of the projection 157 of the bolt 155 without tipping the bolt. This tipping of the bolt 155 operates on the beveled face 161 of a pivoted hook 162, Fig. 39, said hook being urged by a spring. The hook 162 carries a dog that holds up lever 164. When the bolt 160 is tipped it moves the hook 162 against the stress of its spring and draws the dog from under the locking bar. This bar then falls into the position shown in Fig. 41 and enters the recess in bar 164 and locks it against movement thereby locking through it lever 147 whereby the main actuating lever is automatically locked. This automatic locking takes place upon division when one is added to the last nine or subtracted from zero and the locking of the main actuating crank indicates that the knobs 3 and 29 should be reversed.

The main operating crank 59 is especially constructed to prevent too great a pressure or force being applied to the operating mechanism. This crank is illustrated in Figs. 11, 12 and 13 and comprises a disk 167 rigidly connected to the main driving shaft 53. Rotatably mounted on the shaft and on this disk is a second disk 168 to which is connected a crank 59. Between the two disks is a spiral spring 169, one end of which is connected to the disk 167 and the other to the disk 168. This spring forces a face 171 on a flange of disk 168 against a pin 170. Clockwise rotation of the crank 59 will tension the spring, whereupon the cam face 172 on disk 168 rides on a pin 173 mounted in disk 167. This pin is forced down into a hole 174 in the machine frame, and all additional force will be exerted against pin 174 and none transmitted to the mechanism, so that no greater force can be exerted on the lever 147, Fig. 6, than the spring 169 will permit. Since the crank 59 is not to be rotated backward a brake mechanism Fig. 48, is provided which comprises a disk 175 on gear wheel 54 and a similar disk 176 on gear wheel 55. These disks are opposite one another and slightly spaced apart and rotate in opposite directions, and between them is placed a wedge 177 urged by a spring 178. Upon forward movement of the crank 59 the wedge will be forced from between the disk and its spring 178, while the clockwise rotation will assist the entering of the wedge 177 urged by spring 178 between the two disks and lock them so that the crank 59 can only be operated in one direction. Below the gear wheel 55 is a disk 189 provided with a recess Fig. 6, in which takes a roller 188 mounted on a lever 187 and urged against the roller by a spring, Fig. 3. This insures the main shaft 53 and auxiliary shaft assuming proper position at the end of each revolution. In order to bring the counting mechanism back to zero I provide a handle 43, Fig. 34 connected to a rack 184 engaging which are gear wheels 181 secured to which gear wheels 181 are nine toothed gear wheels 183 mounted on shafts. The wheels 183 have a hiatus 182 and mesh with similar mutilated gear wheels 179 on shaft 70, said wheels 179 having a hiatus or omitted portion 180 positioned as shown in Fig. 37, toward the shaft 70 so that the mutilated gears 179 will be free to rotate. When the rack is moved to the left, Fig. 35, all the wheels 179 that do not have their mutilated portions 180 positioned toward the shafts of wheels 238 will be rotated until they do assume this position. Shafts 70 will consequently be rotated and all the disks 41 will show zero. The mechanism is used for setting the quotient and multiplier mechanism to zero, Figs. 43 to 45.

The operation will no doubt be obvious from what has been said. For simple addition a number is set up by the slides 14, the lever 3 set for addition and lever 29 set normal, the crank 59 is rotated whereby the setting up mechanism transfers the number set up through the coupling mechanism, Fig. 8 to the computing mechanism in the carriage, which carriage is not moved. A second number is then set up the crank 59 turned and this second number is then added to the number already transferred to the computing mechanism by operation of the coupling mechanism, Fig. 8, as already described, the operations for division have already been fully described and the operation for multiplication is carried out in a similar manner.

I claim:—

1. In a calculating machine, a number of slidably mounted parallel racks, a proportional lever pivotally connected to the racks and in slidable relation thereto and means to lock either of the outer racks and thereby permit the shifting of the stationary pivot of said lever from one outside rack to the other and vice versa, and means to swing said lever.

2. In a calculating machine, a number of slidably mounted parallel racks, a proportional lever mounted beneath the racks having a slot therein, blocks mounted to slide in the slot, pivots for the racks in the blocks, a second slot, a block slidable therein, a crank, a connecting rod between the crank and last mentioned block and means to lock either or both of the outermost racks when desired.

3. In a calculating machine a number of slidably mounted parallel racks, a proportional lever to which said racks are slidably and pivotally connected, a slidable guide on which said lever is pivoted, a crank and a connecting rod connected to the crank at one end and at the other end pivotally and slidably connected to the lever.

4. In a calculating machine, a set of slidable parallel racks the outer racks of the set being longer than the others of the set, and having perforations therein, a proportional lever, means to pivotally and slidably connect the racks to said lever, a pivoted lever, a bolt connected to the lever adapted to enter the perforations in the racks to lock either or both of them when in their normal position and means to actuate said lever.

5. In a calculating machine, a number of slidably mounted racks, a pivoted lever pivotally connected to the racks and also in slidable relation thereto, a crank, a connecting rod mounted at one end on the crank, means to pivotally and slidably connect the other end of said rod to said lever and means to hold either of the outer racks stationary.

6. In a calculating machine, a number of slidably mounted racks, each rack representing a digit, a proportional lever to move the racks distances proportionate to the several digits represented by them, shafts mounted transversely of the racks, a gear wheel slidable on each shaft, means to shift each gear wheel into mesh with any rack, computing mechanism, and means to transfer the movement of the shafts to said mechanism.

7. In a calculating machine a number of slidable parallel racks, a proportional lever to which the racks are slidably and pivotally connected, shafts mounted transversely of the racks, gear wheels slidable on the shafts and capable of meshing with the racks, a second gear wheel secured on each of said shafts, means to lock either of the outer racks in normal position, a crank, a connecting rod between the crank and lever, computing mechanism and means to couple the gear wheels secured to said shafts to the computing mechanism during the first half revolution of the crank.

8. In a calculating machine, a setting-up mechanism comprising a set of parallel racks, a proportional lever to which said racks are pivotally and slidably connected, shafts mounted transversely of the racks, gear wheels slidable on the shafts and capable of meshing with the racks, a second gear wheel secured on each of said shafts, means to lock either of the outer racks in normal position, means to actuate the lever; in combination with computing mechanism including shafts alined with the shafts of the setting-up mechanism, a gear wheel on each of said shafts, and a coupling mechanism to simultaneously engage the wheels secured to the shafts of the setting-up mechanism and those secured to the shafts of the computing mechanism during the swing of the proportional lever from its normal position only.

9. In a calculating machine the combination with a number of parallel digit shafts and means for actuating them; of a gear wheel on each shaft, a carriage, a computing mechanism having parallel shafts spaced apart the same distance as the aforesaid shafts, a gear wheel on each of said shafts of the computing mechanism, coupling gear wheels below each of the first mentioned gear wheels, means to support and move the coupling wheels into engagement with the axially alined gear wheels on said shafts, and a stationary pin to engage an intermediate space of each coupling gear wheel as it moves out of coupling position, thereby permitting the movement of the carriage with respect to the first mentioned shafts and the coupling of the alined shafts in any position of the carriage.

10. In a calculating machine, comprising setting-up and computing mechanisms, in combination with a coupling mechanism comprising a pair of pivoted bell crank levers, a frame pivotally connected to them and a bar connecting the levers, coupling gear wheels mounted side-by-side in the frame, stationary pins below the frame taking into interdental spaces in the gear when the frame is lowered to accurately position said wheels preparatory to their coupling movement.

11. In a calculating machine, a setting up mechanism and a computing mechanism having carry-one mechanisms; a longitudinally slidable cam shaft to actuate said mechanism, a coupling mechanism to couple the setting-up and computing mechanisms and means on the coupling mechanism to slide said shaft into and out of operative position.

12. In a calculating machine a setting-up mechanism and a computing mechanism having carry-one mechanisms and a main actuating shaft; a longitudinally slidable cam shaft to actuate the carry-one mechanism, and gearing connecting said cam shaft with the main actuating shaft to cause said cam shaft to make two rotations for every rotation of the main shaft and means to slide the shaft at the beginning of the first half rotation of the main shaft to cause said cam shaft to first make an idle rotation.

13. In a calculating machine the combination with a set of parallel racks and means to proportionally move them; of rotatable shafts mounted transversely of the racks, gear wheels capable of sliding on the shafts and of meshing with any of the racks, a slide for each gear wheel, a shaft parallel with each of the aforesaid shafts having a steep spiral thereon, an indicator wheel thereon, a spring mounted in each slide and engaging the spiral of its adjacent shaft and means to hold the slide in the position in which it is set, whereby its gear wheel will be held in engagement with a rack and the indicator wheel be rotated to correspond to the digit set up and remain so set independent of the rotation of the gear wheel by the rack.

14. In a calculating machine a casing having slots therein with notches adjacent each slot, a number of slidable parallel racks transverse of the slots, square shafts transverse of the racks, a gear wheel slidable on each shaft, a shaft having a steep spiral thereon adjacent each square shaft, an indicating wheel on each spiral shaft, a slide in each slot engaging a gear wheel, a spring secured in each slide and engaging the spiral of its adjacent shaft, a second spring mounted on each slide and having rollers adapted to take into said notches.

15. In a calculating machine, the combination with a digit shaft thereon, of a sleeve slidable thereon, a pin carried by the sleeve, a cam in the path of the pin to move the sleeve longitudinally of its shaft, a spring urged hook to retain the sleeve in one of its end positions, a flange on the sleeve, a vertically movable slide to contact with the sleeve when held by said hook, means to release the hook after the slide has been actuated and means on the hook to return the sleeve to normal position when the latter disengages the sleeve.

16. In a calculating machine the combination with a digit shaft 67 thereof, and a disk having a notch therein secured to the shaft; of a sleeve 76 slidable on the shaft, a pin on the sleeve passing through the notch, a cam 77 in the path of the pin, a conical flange 78 and flanges 98 and 102 on the sleeve, a spring urged hook beneath the sleeve having an arm 101, a slide adapted to be deflected by the flange 98, a cam to operate the slide, and cam actuated means to actuate the pawl.

17. In a calculating machine the combination with digit shafts thereof and sleeves longitudinally slidable thereon, of hooks to engage and hold the sleeves preparatory to carrying one to the next higher shaft, slides engaged by the sleeves, hook releasing slides, a longitudinally slidable cam shaft having cams arranged spirally thereon in pairs, said cams having a hiatus in their spiral arrangement to permit the longitudinal shifting of the cam shaft to permit the movement of the cams out of engaging position with their slides.

18. In a calculating machine, the combination with a vertically movable carry-one slide, a pin on the slide, a pivoted pawl having a beveled nose lying against said pin, and a spring connecting the tail of the pawl with the slide; whereby said pawl will urge the slide downward into normal position.

19. In a calculating machine the combination with setting-up mechanism; of a carriage, computing mechanism mounted therein, means to urge the carriage toward its normal position, and hand operated means to give a step by step movement of the carriage from one denomination to another and means to couple the setting-up and computing mechanisms in any position of the carriage.

20. In a calculating machine the combination with a spring urged carriage and computing mechanism mounted therein; of hand operated mechanism to give a step by step movement of the carriage and hand operated mechanism to throw the step by step mechanism temporarily out of operation to permit the carriage to be moved at will, while the computing mechanism is idle.

21. In a calculating machine the combination with a sliding carriage and computing mechanism mounted therein; of a rack, a key lever pivoted to the carriage in operative relation to the rack and a second hand operated vertically movable rack coöperating with the key lever to release it from engagement with the first mentioned rack.

22. In a calculating machine the combination with a setting up mechanism capable of being operated to an extent equal to the digits set up and their complements; of a spring urged sliding carriage mechanism to impart a step by step movement to the carriage upon each change of operation of the setting up mechanism from the complements of the digits to the digits.

23. In a calculating machine the combination with a spring urged sliding carriage of means to control a step by step movement thereof, comprising a rack and a lever pivoted to the carriage and a swinging plate along which the pivoted lever is adapted to move and having notches therein and means to swing the plate to lift the lever from engagement with the rack.

24. In a calculating machine the combination with a spring urged sliding carriage of means to control a step by step movement thereof, comprising a rack and a lever pivoted to the carriage and a swinging plate along which the pivoted lever is adapted to move and having notches therein, means to swing the plate to lift the lever from engagement with the rack and means to longitudinally slide the plate into inoperative position.

25. In a calculating machine the combination with quotient mechanism comprising indicating wheels, and mechanism for driving said wheels, of a worm to drive the aforesaid mechanism, means to positively and negatively drive the worm and means to reverse the drivage.

26. In a calculating machine the combination with a main shaft and setting-up mechanism driven therefrom; of lever actuated locking mechanism therefor, quotient mechanism including a shaft 96, a main actuating shaft from which said shaft 96 is positively and negatively driven, and means operated from said locking mechanism to shift the direction of rotation of said shaft 96.

27. In a calculating machine the combination with a main shaft and setting-up mechanism actuated therefrom; of a lever 109 having locking bars 111 for the setting-up mechanism, a gear wheel 36 driven from the main shaft, a quotient mechanism, a longitudinally movable shaft 96 having two gear wheels 34 and 35 thereon capable of alternately meshing with gear wheel 36 and mechanism actuated by said locking mechanism to shift the shaft 96 when the setting-up mechanism is set free by said locking bars by the movement of lever 109.

28. In a calculating machine the combination with a movable carriage having quotient mechanism mounted therein comprising a plurality of worm wheels mounted in the same plane and digit indicating wheels operated from the worm wheels; of a worm having a slot therein through which the worm wheels pass as the carriage moves and means to rotate the worm wheel both positively and negatively.

29. In a calculating machine a movable carriage having quotient mechanism mounted therein comprising worm wheels, a pawl carried by each, indicating wheels mounted above the worm wheels and ten-toothed wheels carried by the indicating wheels said ten-toothed wheels capable of being actuated by the pawls in both a forward and reverse direction whereby a unit is transferred from one indicating wheel to the next and vice versa, and a slotted worm with relation to which the worm wheels are moved.

30. In a calculating machine the combination with the digit shafts of the computing mechanism and a hand crank to operate the machine; of digit indicating mechanism and mechanism to automatically lock said crank when the last digit passes through zero.

31. In a calculating machine the combination with a crank handle to operate the machine and computing mechanism comprising digit shafts 70 vertically movable slides, carry-one mechanism operated by said slides and means actuated by the last slide to lock the hand crank when the last digit wheel passes from nine to zero.

32. In a calculating machine the hand crank locking mechanism comprising a slidable rocking bolt having two faces 157 and 158, a vertically moving slide 156 having lugs capable of engaging said faces, a longitudinally movable rack 152, a locking lever, and mechanism between said lever and bolt to release the latter, and a lever cooperating with the rack and crank to lock the latter when the rack is locked.

33. In a calculating machine the combination with a main actuating shaft; of a crank handle loose thereon, a disk 167 on the shaft, a similar disk on the handle, a spring connecting the disks, and a pin operated by the aforementioned disk and moved into engagement with a stationary part of the machine.

34. In a calculating machine, a main actuating shaft, a counter shaft operated therefrom, a disk on each shaft and a spring urged wedge adapted to enter between the disks to lock the shafts against counter movement.

Dated this second day of June 1910.

In testimony that I claim the foregoing as my invention, I have signed my name in presence of two subscribing witnesses.

CHRISTEL HAMANN.

Witnesses:
 HENRY HASPER,
 WOLDEMAR HAUPT.